United States Patent
Ishii et al.

(10) Patent No.: US 9,227,368 B2
(45) Date of Patent: *Jan. 5, 2016

(54) GOLF BALLS INCLUDING A CROSSLINKED THERMOPLASTIC POLYURETHANE COVER LAYER HAVING IMPROVED SCUFF RESISTANCE

(71) Applicant: NIKE, Inc., Beaverton, OR (US)

(72) Inventors: Hideyuki Ishii, Portland, OR (US); Yasushi Ichikawa, Tualatin, OR (US); Chien-Hsin Chou, Yun-lin Hsien (TW); Hsin Cheng, Yun-lin Hsien (TW); Chung-Yu Huang, Tainan County (TW); Chen-Tai Liu, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/133,133

(22) Filed: Dec. 18, 2013

(65) Prior Publication Data

US 2014/0103573 A1 Apr. 17, 2014

Related U.S. Application Data

(63) Continuation of application No. 13/193,289, filed on Jul. 28, 2011, now abandoned, which is a continuation-in-part of application No. 12/827,360, filed on Jun. 30, 2010, now Pat. No. 8,193,296.

(51) Int. Cl.
| | |
|---|---|
| A63B 37/00 | (2006.01) |
| A63B 37/04 | (2006.01) |
| A63B 37/12 | (2006.01) |
| C08G 18/86 | (2006.01) |
| C08G 18/67 | (2006.01) |
| B29C 70/70 | (2006.01) |
| B29C 45/14 | (2006.01) |
| C08G 18/48 | (2006.01) |
| C08G 18/66 | (2006.01) |
| C08G 18/76 | (2006.01) |
| C08L 75/14 | (2006.01) |
| C08F 299/06 | (2006.01) |

(52) U.S. Cl.
CPC ............ *B29C 70/70* (2013.01); *A63B 37/0003* (2013.01); *A63B 37/0023* (2013.01); *A63B 37/0024* (2013.01); *A63B 37/0031* (2013.01); *A63B 37/0037* (2013.01); *A63B 37/0039* (2013.01); *A63B 37/0059* (2013.01); *A63B 37/0061* (2013.01); *A63B 37/0076* (2013.01); *A63B 37/12* (2013.01); *B29C 45/14819* (2013.01); *C08F 299/065* (2013.01); *C08G 18/4854* (2013.01); *C08G 18/6674* (2013.01); *C08G 18/675* (2013.01); *C08G 18/7671* (2013.01); *C08G 18/86* (2013.01); *C08L 75/14* (2013.01)

(58) Field of Classification Search
None
See application file for complete search history.

(56) References Cited

U.S. PATENT DOCUMENTS

| | | |
|---|---|---|
| 3,368,988 A | 2/1968 | Kazys |
| 3,402,148 A | 9/1968 | Sutker et al. |
| 3,457,324 A | 7/1969 | Sekmakas |
| 3,557,249 A | 1/1971 | Dannels et al. |
| 3,703,498 A | 11/1972 | Harris |
| 3,714,092 A | 1/1973 | Mazzeo et al. |
| 3,779,995 A | 12/1973 | Dannels et al. |
| 4,151,153 A | 4/1979 | Ashcroft et al. |
| 5,095,069 A | 3/1992 | Ambrose et al. |
| 5,919,600 A | 7/1999 | Huang et al. |
| 6,180,181 B1 | 1/2001 | Verardi et al. |
| 6,284,840 B1 | 9/2001 | Rajagopalan et al. |
| 6,358,161 B1 | 3/2002 | Aoyama |
| 6,435,986 B1 | 8/2002 | Wu et al. |
| 6,476,176 B1 | 11/2002 | Wu |
| 6,582,326 B2 | 6/2003 | Wu et al. |
| 6,635,716 B2 | 10/2003 | Voorheis et al. |
| 6,835,794 B2 | 12/2004 | Wu et al. |
| 7,163,472 B2 | 1/2007 | Dalton et al. |
| 7,214,738 B2 | 5/2007 | Wu et al. |
| 7,226,368 B2 | 6/2007 | Cavallaro et al. |
| 7,358,294 B2 | 4/2008 | Buckmann et al. |
| 7,402,649 B2 | 7/2008 | Kuntimaddi |
| 7,417,107 B2 | 8/2008 | Rajagopalan et al. |
| 8,193,296 B2 | 6/2012 | Ishii et al. |
| 8,932,680 B2 * | 1/2015 | Ishii et al. .................. 427/407.1 |
| 8,980,155 B2 * | 3/2015 | Ichikawa et al. ............ 264/279.1 |
| 8,987,405 B2 * | 3/2015 | Ichikawa et al. ................ 528/75 |

(Continued)

FOREIGN PATENT DOCUMENTS

| | | |
|---|---|---|
| AU | 742533 B2 | 1/2002 |
| BE | 671672 A | 2/1966 |

(Continued)

OTHER PUBLICATIONS

Extended Search Report dated Oct. 21, 2011 in European Patent Application No. EP10172272.

(Continued)

*Primary Examiner* — David Buttner
(74) *Attorney, Agent, or Firm* — Honigman Miller Schwartz & Cohn LLP; Anna M. Budde; Jonathan P. O'Brien

(57) ABSTRACT

This disclosure relates to golf balls having a cover layer made from a crosslinked thermoplastic polyurethane elastomer. The crosslinked thermoplastic polyurethane elastomer includes crosslinks located in the hard segments, where the crosslinks being the reaction product of unsaturated bonds located in the hard segments catalyzed by a free radical initiator. The crosslinks may be formed from an unsaturated diol as a chain extender. The unsaturated diol may be trimethylolpropane monoallylether (TMPME). The cover layer may have certain properties, such as a desirable flexural modulus value and a desirable Shore D hardness value, that further contribute to the golf ball having a high degree of scuff resistance.

9 Claims, 1 Drawing Sheet

(56) References Cited

U.S. PATENT DOCUMENTS

| | | |
|---|---|---|
| 2002/0160863 A1 | 10/2002 | Wu et al. |
| 2003/0064826 A1 | 4/2003 | Voorheis et al. |
| 2003/0096936 A1 | 5/2003 | Wu et al. |
| 2003/0114247 A1 | 6/2003 | Cavallaro et al. |
| 2004/0014922 A1 | 1/2004 | Buckmann et al. |
| 2004/0198537 A1 | 10/2004 | Dalton et al. |
| 2004/0209708 A1 | 10/2004 | Bulpett et al. |
| 2005/0009642 A1 | 1/2005 | Wu et al. |
| 2005/0272899 A1 | 12/2005 | Wu |
| 2006/0009309 A1 | 1/2006 | Rajagopalan et al. |
| 2006/0030680 A1 | 2/2006 | Kuntimaddi |
| 2006/0040767 A1 | 2/2006 | Cavallaro et al. |
| 2006/0284586 A1 | 12/2006 | Hagberg et al. |
| 2008/0051233 A1 | 2/2008 | Nesbitt et al. |
| 2009/0004396 A1 | 1/2009 | Wu et al. |
| 2009/0023515 A1 | 1/2009 | Tarao |
| 2009/0197000 A1 | 8/2009 | Limerkens et al. |
| 2009/0286624 A1 | 11/2009 | Petrichko et al. |
| 2009/0286625 A1 | 11/2009 | Petrichko et al. |
| 2010/0331113 A1 | 12/2010 | Shiga et al. |
| 2011/0186329 A1 | 8/2011 | Makal et al. |
| 2012/0004351 A1 | 1/2012 | Huang et al. |
| 2012/0077621 A1 | 3/2012 | Ishii et al. |
| 2013/0029786 A1* | 1/2013 | Ishii et al. ............. 473/373 |
| 2013/0172117 A1 | 7/2013 | Ichikawa et al. |
| 2013/0172118 A1 | 7/2013 | Ichikawa et al. |
| 2013/0172122 A1 | 7/2013 | Ichikawa et al. |

FOREIGN PATENT DOCUMENTS

| | | | |
|---|---|---|---|
| BE | 742824 A | | 6/1970 |
| BE | 786479 A1 | | 11/1972 |
| CA | 987831 A1 | | 4/1976 |
| CA | 2040280 A1 | | 3/1992 |
| CA | 2350631 A1 | | 6/2000 |
| CA | 2653658 A1 | | 12/2007 |
| CA | 2708471 A1 | | 9/2010 |
| CN | 1105030 A | | 7/1995 |
| CN | 1817934 A | | 8/2006 |
| CN | 100475874 C | | 4/2009 |
| CN | 101466755 A | | 6/2009 |
| DE | 2237614 A1 | | 3/1973 |
| DE | 10004499 A1 | | 8/2001 |
| EP | 473169 A2 | | 3/1992 |
| EP | 473169 A3 | | 10/1992 |
| EP | 1011984 A1 | | 6/2000 |
| EP | 1140378 A1 | | 10/2001 |
| EP | 1328563 A1 | | 7/2003 |
| ES | 2205936 T3 | | 5/2004 |
| FR | 1418816 A | | 11/1965 |
| FR | 1531115 A | | 6/1968 |
| FR | 2027306 A1 | | 9/1970 |
| FR | 2061490 A5 | | 6/1971 |
| GB | 997393 A | | 7/1965 |
| GB | 1032873 A | | 6/1966 |
| GB | 1270354 A | | 4/1972 |
| GB | 1304858 A | | 1/1973 |
| GB | 1304859 A | | 1/1973 |
| GB | 1305368 A | | 1/1973 |
| GB | 1395773 A | | 5/1975 |
| JP | 46014752 | | 4/1971 |
| JP | 49021119 | | 5/1974 |
| JP | 11152406 | | 6/1999 |
| JP | 2002268220 A | | 9/2002 |
| JP | 2006091485 A | | 4/2006 |
| JP | 2006255706 A | | 9/2006 |
| JP | 2007007427 A | | 1/2007 |
| JP | 2007238895 | | 9/2007 |
| JP | 2008179812 A | | 8/2008 |
| JP | 2009022465 A | | 2/2009 |
| JP | 2011010683 A | | 1/2011 |
| KR | 2009031566 | | 3/2009 |
| KR | 1047087 | | 7/2011 |
| MX | 2008015944 A | | 1/2009 |
| NL | 6919533 A | | 7/1970 |
| NL | 7211104 A | | 2/1973 |
| WO | 9911467 A1 | | 3/1999 |
| WO | 9952604 A1 | | 10/1999 |
| WO | 9961113 A1 | | 12/1999 |
| WO | 0035600 | | 6/2000 |
| WO | 0232980 | | 4/2002 |
| WO | 2007144292 A1 | | 12/2007 |
| WO | 2009002783 A1 | | 12/2008 |

OTHER PUBLICATIONS

Prior Art Search Report as written by the Korean Institute of Patent Information on Sep. 30, 2010 in Korean Patent Application No. 10-2010-0091609, with English translation.

* cited by examiner

GOLF BALLS INCLUDING A CROSSLINKED THERMOPLASTIC POLYURETHANE COVER LAYER HAVING IMPROVED SCUFF RESISTANCE

STATEMENT OF RELATED APPLICATIONS

This application is a continuation of application Ser. No. 13/193,289, filed Jul. 28, 2011 now abandoned, which is a continuation-in-part application of application Ser. No. 12/827,360, filed Jun. 30, 2010, now U.S. Pat. No. 8,193,296, each of which is incorporated herein by reference in its entirety.

BACKGROUND OF THE INVENTION

1. Field of the Invention

The present invention relates to golf balls and their manufacture, and in particular to golf balls having thermoplastic polyurethane covers.

2. Description of Related Art

Golf ball covers are generally divided into two types: thermoplastic covers and thermoset covers. Thermoplastic polymer materials may be reversibly melted, and so may be used in a variety of manufacturing techniques such as compression molding that take advantage of this property. On the other hand, thermoset polymer materials are generally formed by mixing two or more components to form a cured polymer material that cannot be re-melted or re-worked. Each type of polymer material present advantages and disadvantages when used to manufacture golf balls.

Thermoplastic materials for golf ball covers often include ionomer resin, highly neutralized acid polymer composition, polyamide resin, polyester resin, polyurethane resin, polyurethane resin, and mixtures thereof. Among these, ionomer resin and polyurethane resin are popular materials for golf ball covers.

Ionomer resins, such as Surlyn® resins (commercially available from E.I. DuPont de Nemours and Company), have conventionally been used for golf ball covers. For example, Dunlop Rubber Company obtained the first patent on the use of Surlyn® for the cover of a golf ball, U.S. Pat. No. 3,454,280 issued Jul. 8, 1969. Since then, there have been a number of disclosures on the use of ionomer resins in the cover composition of a golf ball, for example, U.S. Pat. Nos. 3,819,768, 4,323,247, 4,526,375, 4,884,814, and 4,911,451.

However, ionomer resin covered golf balls suffer from the problem that the cover surface may be scraped off by grooves on a clubface during repeated shots, particularly with irons. In other words, ionomer covers have poor scuff resistance. Also, ionomer covered balls usually have inferior spin and feel properties as compared to balata rubber or polyurethane covered balls. The use of softer ionomer resins for the cover will improve spin and feel to some extent, but will also compromise the resilience of the golf balls because such balls usually have a lower coefficient of restitution (C.O.R.). Furthermore, the scuff resistance of such softer ionomer covers is often still not satisfactory.

Thermoplastic polyurethane elastomers may also be used as the cover material, as described in (for example) U.S. Pat. Nos. 3,395,109, 4,248,432 and 4,442,282. However, the thermoplastic polyurethane elastomers disclosed therein do not satisfy all the requirements of moldability, hitting feel, control, resilience, and scuff resistance upon iron shots.

On the other hand, thermoset polymer materials such as polyurethane elastomers, polyamide elastomers, polyurea elastomers, diene-containing polymer, crosslinked metallocene catalyzed polyolefin, and silicone, may also be used to manufacture golf balls. Among these materials, thermoset polyurethane elastomers are popular.

U.S. Pat. Nos. 3,989,568, 4,123,061, 5,334,673, and 5,885,172, describe many attempts to use thermoset polyurethane elastomers as a substitute for balata rubber and ionomer resins. Thermosetting polyurethane elastomers are relatively inexpensive and offer good hitting feel and good scuff resistance. Particularly, thermoset polyurethane elastomers may present improvements in the scuff resistance as compared to softened ionomer resin blends. However, thermoset materials require complex manufacturing processes to introduce the raw material and then effect a curing reaction, which causes the manufacturing process to be less efficient.

Accordingly, for the foregoing reasons, there is a need to develop a golf ball cover material with good scuff resistance that can be efficiently manufactured. There is a need in the art for a system and method that addresses the shortcomings of the prior art discussed above.

SUMMARY OF THE INVENTION

In one aspect, this disclosure provides a golf ball comprising: a core, and a cover layer substantially surrounding the core; wherein the cover layer comprises a crosslinked thermoplastic polyurethane elastomer; the crosslinked thermoplastic polyurethane elastomer including hard segments and soft segments, the crosslinked thermoplastic polyurethane elastomer including crosslinks located in the hard segments, the crosslinks being the reaction product of unsaturated bonds located in the hard segments catalyzed by a free radical initiator; and wherein the cover layer has a flexural modulus of from about 200 psi to about 10,000 psi.

In a particular embodiment of the above golf ball, this disclosure provides a golf ball comprising: a core, and a cover layer substantially surrounding the core; wherein the cover layer comprises a crosslinked thermoplastic polyurethane elastomer; the crosslinked thermoplastic polyurethane elastomer including hard segments and soft segments, the crosslinked thermoplastic polyurethane elastomer including crosslinks located in the hard segments, the crosslinks being the reaction product of unsaturated bonds located in the hard segments catalyzed by a free radical initiator; and wherein the crosslinked thermoplastic polyurethane elastomer is the reaction product of an unsaturated diol of formula (1):

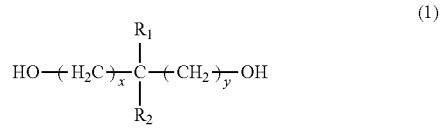

(1)

in which $R^1$ may be any substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, and $R^2$ includes an allyl group; and x and y are integers independently having any value from 1 to 10.

In another aspect, the present disclosure provides a golf ball comprising: an inner core layer, an outer core layer substantially surrounding the inner core layer, an inner cover layer substantially surrounding the outer core layer, and an outer cover layer substantially surrounding the inner cover layer; wherein the outer cover layer comprises a crosslinked thermoplastic polyurethane elastomer having crosslinks located in hard segments, the crosslinks being the reaction product of unsaturated bonds located in the hard segments catalyzed by a free radical initiator; and the golf ball satisfies the following requirements: (1) the outer cover layer has a Shore D hardness on the golf ball from about 40 to about 65; and (2) the outer cover layer has a flexural modulus of from about 200 psi to about 10,000 psi.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, this disclosure relates to golf balls having a cover layer manufactured from a crosslinked thermoplastic polyurethane, where the crosslinks are formed in the hard segments. In particular embodiments an outer cover layer may be made from the crosslinked thermoplastic polyurethane, where the outer cover layer may have a desirable flexural modulus value. As a result of these features, the outer cover layer's scuff resistance may be greatly improved.

Except as otherwise discussed herein below, any golf ball discussed herein may generally be any type of golf ball known in the art. Namely, unless the present disclosure indicates to the contrary, a golf ball may generally be of any construction conventionally used for golf balls, and may be made of any of the various materials known to be used in golf ball manufacturing. Furthermore, it is understood that any feature disclosed herein (including but not limited to various embodiments shown in the FIGS. and various chemical formulas or mixtures) may be combined with any other features disclosed here, as may be desired.

Figure 1:
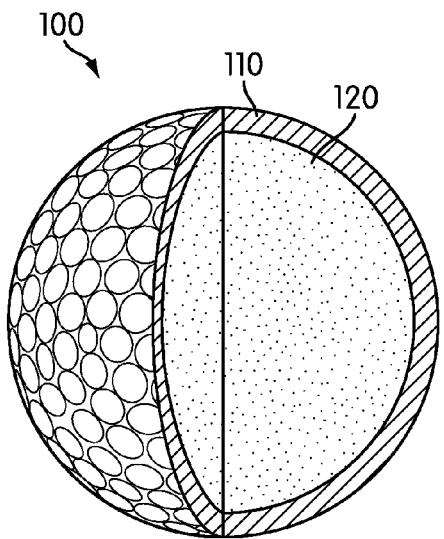
FIG. 1 shows a representative golf ball in accordance with this disclosure, the golf ball being of a two-piece construction.

FIG. 1 shows a golf ball 100 in accordance with a first embodiment of the present disclosure. Golf ball 100 is a two piece golf ball. Specifically, golf ball 100 includes cover layer 110 substantially surrounding core 120. In golf ball 100, cover layer 110 may be made of a crosslinked thermoplastic polyurethane elastomer.

The crosslinked thermoplastic polyurethane elastomer may include hard segments and soft segments, as thermoplastic polyurethanes are known to include. Thermoplastic polyurethanes are generally made up of (1) a long chain polyol, (2) a relatively short chain extender, and (3) a diisocyanate. Once reacted, the portions of the polymer chain made up of the chain extender and diisocyanate generally align themselves into semi-crystalline structures through weak (i.e., non-covalent) association, such as through Van der Waals forces, dipole-dipole interactions or hydrogen bonding. These portions are commonly referred to as the hard segments, because the semi-crystalline structure is harder than the amorphous portions made up of the long chain polyol.

The crosslinked thermoplastic polyurethane may include crosslinks located specifically in the hard segments. These crosslinks may be the reaction product of unsaturated bonds located in the hard segments, catalyzed by a free radical initiator. These unsaturated bonds may be introduced into the hard segments by the use of unsaturated diols as chain extenders. In particular embodiments, the crosslinks may be formed from diol chain extenders having an unsaturated side chain.

Generally, the crosslinked thermoplastic polyurethane may be derived from reacting a mixture of:
(a) an organic isocyanate;
(b) an unsaturated diol first chain extender;
(c) optionally, a second chain extender having at least two reaction sites with isocyanates and having a molecular weight of less than about 450;
(d) a long chain polyol having a molecular weight of between about 500 and about 4,000; and
(e) a sufficient amount of free radical initiator, so as to be capable of generating free radicals that induce crosslinking structures in the hard segments by free radical initiation.

Each of the above listed reactants will be discussed in further detail, with the understanding that any particular embodiment of a specific reactant may be mixed and matched with any other specific embodiment of another reactant according to the general formulation above. Furthermore, any reactant may generally be used in combination with other reactants of the same type, such that any list herein includes mixtures thereof, unless otherwise specified.

The organic isocyanate may include any of the known aromatic, aliphatic, and cycloaliphatic di- or polyisocyanates. Examples of suitable isocyanates include: 2,2'-, 2,4'- (and particularly) 4,4-diphenylmethane diisocyanate, and isomeric mixtures thereof ("MDI"); polyphenylene polymethylene polyisocyanates (poly-MDI, PMDI); 2,4- and 2,6-toluene diisocyanates, and isomeric mixtures thereof such as an 80:20 mixture of the 2,4- and 2,6-isomers ("TDI"); isophorone diisocyanate; 1,4-diisocyanatobutane; 1,5-diisocyanatopentane; 1,6-diisocyanatohexane; 1,4-cyclohexane diisocyanate; cycloaliphatic analogs of PMDI; and the like.

The unsaturated diol first chain extender is discussed substantially below.

Suitable optional second chain extenders may include the common diols, such as ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like. Minor amounts of crosslinking agents such as glycerine, trimethylolpropane, diethanolamine, and triethanolamine may be used in conjunction with the diol chain extenders.

In addition to the common diol chain extenders, diamines and amino alcohols may also be used as the optional second chain extender. Examples of suitable diamines include aliphatic, cycloaliphatic or aromatic diamines. In particular, a diamine chain extender may be ethylene diamine, hexamethylene diamine, 1,4-cyclohexyene diamine, benzidine, toluene diamine, diaminodiphenyl methane, the isomers of phenylene diamine or hydrazine. Aromatic amines may also be used, such as MOCA (4,4'-methylene-bis-o-chloroaniline), M-CDEA (4,4'-methylenebis(3-chloro-2-6-diethylaniline)). Examples of suitable amino alcohols are ethanol amine, N-methylethanolamine, N-butylethanolamine, N-oleyethanolamine, N-cyclohexylisopropanolamine, and the like. Mixtures of various types of chain extenders may also be used to form the crosslinked thermoplastic polyurethane.

The long chain polyol ("the polyol") may generally be a polyester polyol or a polyether polyol. Accordingly, the crosslinked thermoplastic polyurethane may be either general type of polyurethane: a polyether based polyurethane elastomer or a polyester based polyurethane elastomer, or mixtures thereof.

The long chain polyol may be a polyhydroxy compound having a molecular weight between 500 and 4,000. Suitable long chain polyols may generally include linear polyesters, polyethers, polycarbonates, polylactones (e.g., ε-caprolactone), and mixtures thereof. In addition to polyols having hydroxyl terminal groups, the polyol may include carboxyl, amino or mercapto terminal groups.

Polyester polyols are produced by the reaction of dicarboxylic acids and diols or esterifiable derivative thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, and the like. Both of the dicarboxylic acids and diols can be used individually or in mixtures to make specific polyesters in the practice applications.

Polyether polyols are prepared by the ring-opening addition polymerization of an alkylene oxide with an initiator of a polyhydric alcohol. Examples of suitable polyether polyols are polypropylene glycol (PPG), polyethylene glycol (PEG), polytetramethylene ether glycol (PTMEG). Block copolymers such as combinations of polyoxypropylene and polyoxyethylene glycols, poly-1,2-oxybutylene and polyoxyethylene glycols, poly-1,4-tetramethylene and polyoxyethylene glycols are also typical in the present invention.

Polycarbonate polyols are made through a condensation reaction of diols with phosgene, chloroformic acid ester, dialkyl carbonate or diallyl carbonate. Examples of diols in the suitable polycarbonate polyols of the crosslinked thermoplastic polyurethane elastomers are ethanediol, diethylene glycol, 1,3-butanediol, 1,4-butanediol, 1,6-hexanediol, neopentylglycol, and 1,5-pentanediol.

The crosslinked thermoplastic polyurethane elastomer may comprise a sufficient amount of free radical initiator so as to be capable of inducing crosslinking structures in the hard segments by free radical initiation. The free radical initiator may generate free radicals through thermal cleavage or UV radiation. When the half-life of the free radical initiator and its operation temperature are considered in the manufacturing process, the weight ratio of initiators to unsaturated diols may be from 0.1:100 to 100:100. In particular embodiments, the weight ratio of free radical initiator to unsaturated diols may be about 5:100.

A variety of known free radical initiators may be used as the radical source in order to make the present polyurethane elastomer having a crosslinking structure. Suitable radical initiators may include peroxides, sulfurs, and sulfides, and peroxides may be particularly suitable in some embodiments. The peroxides may be aliphatic peroxides, aromatic peroxides, or mixtures thereof. Peroxides such as diacetylperoxide, di-tert-butyperoxide, dicumylperoxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl) peroxide may be used as the free radical initiator in some embodiments.

The unsaturated diol first chain extender may generally be any diol having at least one terminal pendant unsaturated bond. Generally, as is known in the art of polyurethane chemistry, a diol is used as a chain extender in thermoplastic polyurethane by reacting each of the two hydroxyl groups with the isocyanate. Here, at least one terminal pendant unsaturated bond may then be used to create crosslinks between the polyurethane backbones. As is generally known, an unsaturated bond may be a double bond between two carbon atoms (as in an alkene) or a triple bond (as in an alkyne)

In particular embodiments, the unsaturated diol may have two primary alcohol groups. The presence of two primary alcohol groups may result in favorable reaction kinetics, such that the crosslinked thermoplastic polyurethane may be formed in an easily controlled "one step" continuous process.

An unsaturated side chain present on the diol may generally be any alkyl, aryl, or alkyl-aryl group, ether group, or ester group including at least one terminal vinyl group. In particular embodiments, the unsaturated side chain may include an allyl group. The unsaturated diol and its side chain may be represented by formula (1) shown below:

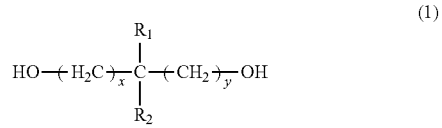

(1)

in which $R^1$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, and $R^2$ includes an allyl group; and x and y are integers independently having any value from 1 to 10.

The above mentioned chemical groups may have their conventional definitions as is generally known in the art of chemistry. Specifically, an unsubstituted alkyl group includes any chemical group comprising only carbon and hydrogen linked by single bonds. A substituted alkyl group may include atoms other than carbon and hydrogen in a side chain portion, such as a halogen group, an inorganic group, or other well known functional groups. In some embodiments, a substituted or unsubstituted alkyl group may include from 1 to about 100 carbon atoms in the alkyl chain. In other embodiments, a substituted or unsubstituted alkyl group may have from 1 to 10 carbon atoms in the alkyl chain. An alkyl group, or any portion thereof, or alkyl substituent, may be a straight chain or branched.

As is further known in the art of chemistry, an aryl group is defined as any group that includes an aromatic benzene ring. Furthermore, an alkyl-aryl group includes at least one aromatic benzene ring in addition to at least one alkyl carbon. An ether group includes at least one oxygen atom bonded to two carbon atoms. An ester group includes at least one carbon atom that is double bonded to a first oxygen atom and single bonded to a second oxygen atom.

In some embodiments substituted groups, such as a substituted alkyl group or a substitute aryl group, may be substituted with another of the same group. For example, an alkyl may be substituted with another alkyl to create a branched alkyl group. In other embodiments substituted groups may be substituted with a different group, for example an alkyl may be substituted with an ether group, or an ether group may be substituted with an alkyl group. A person having ordinary skill in the art of chemistry may also synthesize suitable combinations of these groups, as may be desired.

In specific embodiments, the unsaturated diol may include an allyl ether group as the side chain. For example, the unsaturated diol may be represented by formula (2) shown below:

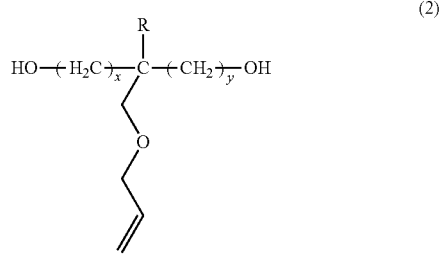

(2)

in which R is a substituted or unsubstituted alkyl group, and x and y are integers independently having values of 1 to 4. In particular embodiments, x and y may both have values of 1, 2, 3 or 4. In other embodiments, x and y may each have different values from 1 to 4.

In one particular embodiment, the unsaturated diol may be trimethylolpropane monoallylether ("TMPME"). TMPME may also be named "trimethylol propane monoallyl ether", "trimethylol propane monoallylether", or "trimethylolpropane monoallyl ether." TMPME has CAS no. 682-11-1. TMPME may also be referred to as 1,3-Propanediol, 2-ethyl-2-[(2-propen-1-yloxy)methyl] or as 2-allyloxymethyl-2-ethyl-1,3-propanediol. TMPME is commercially available from Perstorp Specialty Chemicals AB.

Other suitable compounds that may be used as the unsaturated diol of formula (1) or formula (2) may include: 1,3-Propanediol, 2-(2-propen-1-yl)-2-[(2-propen-1-yloxy)methyl]; 1,3-Propanediol, 2-methyl-2-[(2-propen-1-yloxy)methyl]; 1,3-Propanediol, 2,2-bis[(2-propen-1-yloxy)methyl; and 1,3-Propanediol, 2-[(2,3-dibromopropoxy)methyl]-2-[(2-propen-1-yloxy)methyl]. Further compounds within the scope of formula (1) or formula (2) may be known to a person having ordinary skill in the art, and may be used in the present disclosure.

The weight ratio of crosslinked thermoplastic polyurethane elastomer to the unsaturated diols may generally be from about 100:0.1 to about 100:25. In particular embodiments, the weight ratio of crosslinked thermoplastic polyurethane elastomer to the unsaturated diols may be about 100:10. Furthermore, the NCO index of the reactants making up the crosslinked thermoplastic polyurethane elastomer may be from about 0.9 to about 1.3. As is generally known, the NCO index is the molar ratio of isocyanate functional groups to active hydrogen containing groups. In particular embodiments, the NCO index may be about 1.0.

Optionally, the crosslinked thermoplastic polyurethane elastomer may include further components such as fillers and/or additives. Fillers and additives may be used based on any of a variety of desired characteristics, such as enhancement of physical properties, UV light resistance, and other properties. For example, to improve UV light resistance, the crosslinked thermoplastic polyurethane elastomer may include at least one light stabilizer. Light stabilizers may include hindered amines, UV stabilizers, or a mixture thereof.

Inorganic or organic fillers can be also added to the crosslinked thermoplastic polyurethane elastomer. Suitable inorganic fillers may include silicate minerals, metal oxides, metal salts, clays, metal silicates, glass fibers, natural fibrous minerals, synthetic fibrous minerals or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 30 percent by weight of the polyurethane components.

Flame retardants may also be used to improve the flame resistance of the crosslinked thermoplastic polyurethane elastomer. Suitable flame retardants may include organic phosphates, metal phosphates, metal polyphosphates, metal oxides (such as aluminum oxide hydrate, antimony trioxide, arsenic oxide), metal salts (such as calcium sulfate, expandable graphite), and cyanuric acid derivatives (such as melamine cyanurate). These flame retardants may be used individually or as a mixture thereof, and the total amount of the flame retardant may be from about 10 to about 35 percent by weight of the polyurethane components.

To improve toughness and compression rebound, the crosslinked thermoplastic polyurethane elastomer may include at least one dispersant, such as a monomer or oligomer comprising unsaturated bonds. Examples of suitable monomers include styrene, acrylic esters; suitable oligomers include di- and tri-acrylates/methacrylates, ester acrylates/methacrylates, urethane or urea acrylates/methacrylates.

If the outermost layer of a golf ball comprises the crosslinked thermoplastic polyurethane elastomer, then the crosslinked thermoplastic polyurethane elastomer may include at least one white pigment to aid in better visibility. The white pigment may be selected from the group consisting of titanium dioxide, zinc oxide or a mixture thereof.

The crosslinked thermoplastic polyurethane elastomer may generally be formed by a single-screw, twin-screw, or a batch method in order to mix and react all of the ingredients described above. The products of the reaction process may be in the form of pellets or ground chips.

If a single-screw or twin-screw process is used, the dwell times of the molten reaction mixture in the screw extruder may generally be in the range of from about 0.3 to about 10 minutes, and in some embodiments may be from about 0.4 to about 4 minutes. The temperature of the screw housing may be in the range of about 70 degrees Celsius to 280 degrees Celsius. The melt leaving the extruder may be chilled and broken down into small pieces using any method for the following injection or extrusion applications.

If a batch method is used to form the crosslinked thermoplastic polyurethane elastomer, all the components are molten and mixed together with a high agitated stir at a temperature in the range of about 70 degrees Celsius to 120 degrees Celsius for about 1 to about 3 minutes. Subsequently, the mixture is subjected to a post curing process at a temperature in the range of about 70 degrees Celsius to 150 degrees Celsius for about 5 to about 18 hours. The products made by this batch method may be comminuted into chips for an injection or extrusion application.

Figure 2:
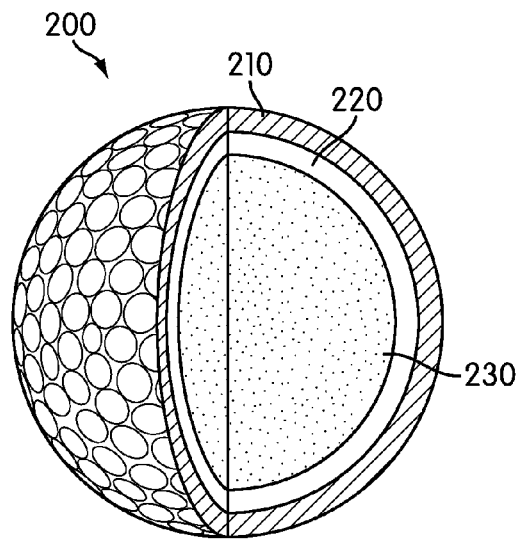
FIG. 2 shows a second representative golf ball, having an inner cover layer and an outer cover layer.

FIG. 2 shows a golf ball 200 in accordance with a second embodiment of the present disclosure. Golf ball 200 includes a core 230, an inner cover layer 220 substantially surrounding core 230, and an outer cover layer 210 substantially surrounding inner cover layer 220. In some embodiments, both inner cover layer 220 and outer cover layer 210 may comprise the crosslinked thermoplastic polyurethane elastomer described herein. In other embodiments, either inner cover layer 220 or outer cover layer 210 comprises the crosslinked thermoplastic polyurethane elastomer described herein. In still other embodiments, outer cover layer 210 in particular comprises the crosslinked thermoplastic polyurethane elastomer described herein.

Figure 3:
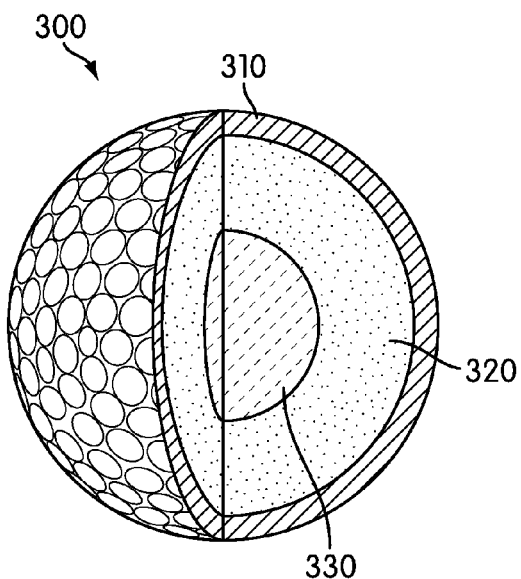
FIG. 3 shows a third representative golf ball, having an inner core and an outer core.

FIG. 3 shows a golf ball 300 in accordance with a third embodiment of the present disclosure. Golf ball 300 includes an inner core layer 330, an outer core layer 320 substantially surrounding inner core layer 330, and a cover layer 310 substantially surrounding outer core layer 320. In some embodiments, cover layer 310 may comprise the crosslinked thermoplastic polyurethane elastomer described herein.

Figure 4:
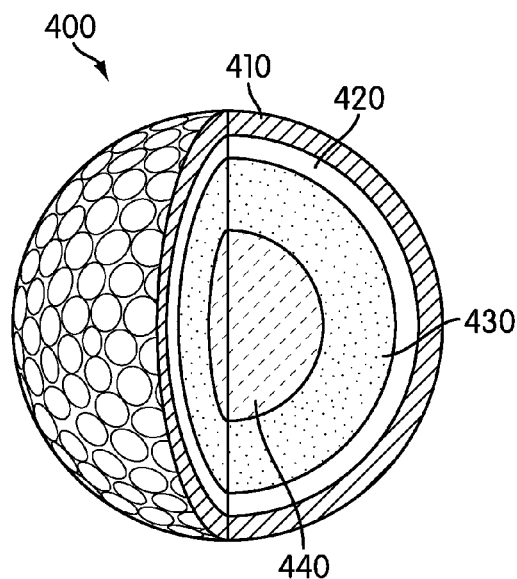
FIG. 4 shows a fourth representative golf ball, having an inner core, an outer core, an inner cover layer, and an outer cover layer.

FIG. 4 shows a golf ball 400 in accordance with a fourth embodiment of the present disclosure. Golf ball 400 includes an inner core layer 440, an outer core layer 430 substantially surrounding inner core layer 440, an inner cover layer 420 substantially surrounding outer core layer 430, and an outer cover layer 410 substantially surrounding inner cover layer 420. In some embodiments, both inner cover layer 420 and outer cover layer 410 comprise the crosslinked thermoplastic polyurethane elastomer described herein. In other embodiments, either inner cover layer 420 or outer cover layer 410 may include the crosslinked thermoplastic polyurethane elastomer described herein. In specific embodiments, outer cover layer 410 comprises the crosslinked thermoplastic polyurethane elastomer described herein.

In any embodiment in which the cover or outer cover layer (i.e. cover 110, cover 310, outer cover layer 210, or outer cover layer 410) comprises the crosslinked thermoplastic polyurethane described herein, the cover or outer cover layer may also have certain advantageous physical properties. For example, a cover or outer cover layer may have desired hardness value. Specifically, a cover or outer cover layer may have a Shore D hardness of from about 40 to about 65, or from about 45 to about 60, on the golf ball.

In some embodiments, a cover or outer cover layer comprised of the crosslinked thermoplastic polyurethane may also have a desired flexural modulus value. Values of the flexural modulus are determined according to ASTM D790, for example by ASTM D790-10B. In accordance with ASTM D790, the value of the flexural modulus is measured on the slab of material. The value of the flexural modulus of the cover or outer cover layer may be from about 200 psi to about 10,000 psi. In some embodiments, the flexural modulus may have a value from about 200 psi to about 7,000 psi, or from about 200 psi to about 5,000 psi, or from about 200 psi to about 4,000 psi, or from about 300 psi to about 5,000 psi, or from about 400 psi to about 2,000 psi. In yet other embodiments, the flexural modulus may have a value of from about 200 psi to about 1,000 psi. Finally, the flexural modulus may have a value of about 500 psi in some embodiments.

The construction of the golf ball according to the present disclosure is not limited to the aforementioned embodiments. A golf ball in accordance with this disclosure may generally take any construction, such as a regulation or non-regulation construction. Regulation golf balls are golf balls which meet the Rules of Golf as approved by the United States Golf Association (USGA).

The crosslinked thermoplastic polyurethane elastomer described variously above may be used to make golf balls by injection molding or compression molding. Injection molding may be used in particular embodiments in order to achieve increased productivity. Generally, the free radical initiator may be added to the polymer mixture at any of several stages during manufacturing. For example, the radical initiator may be added during extrusion of the polymer mixture, or during compression molding. Similarly, the free radical initiator may be activated so as to form crosslinks during any of several stages of manufacturing. For example, the free radical initiator may be activated by heating during an extrusion process.

For any ball layer(s) other than the layer(s) comprising the crosslinked thermoplastic polyurethane elastomer, suitable materials may generally be selected from any of the various materials known to be used in golf ball manufacturing. Generally, these other layers may be constructed as described below.

First, in golf balls having an inner core and an outer core, such as are shown in FIGS. 3 and 4, the inner and outer cores may be constructed as may be generally known in the art of three-piece and four-piece golf ball, or as described below.

In certain embodiments, an inner core (such as inner core 330 or inner core 440) may have certain physical properties. For example, an inner core may have a COR value from 0.785 to 0.9, or from 0.795 to 0.89, or from 0.8 to 0.88. An inner core may have a first coefficient of restitution, where golf ball 200 has a second coefficient of restitution, and the first coefficient of restitution is higher than the second coefficient of restitution by at least 0.01. The golf ball of the present invention may have a coefficient of restitution of at least 0.775.

An inner core layer may be made from a highly neutralized acid polymer composition. Suitable highly neutralized acid polymer compositions may include HPF resins such as HPF1000, HPF2000, HPF AD1027, HPF AD1035, HPF AD1040 and a mixture thereof, all produced by E.I. Dupont de Nemours and Company. Suitable highly neutralized acid polymer compositions for use in forming an inner core may comprise a highly neutralized acid polymer composition and optionally additives, fillers, and/or melt flow modifiers. For example, the acid polymer may be neutralized to 70% or higher, including up to 100%, with a suitable cation source, such as magnesium, sodium, zinc, or potassium.

Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., inner core material that is ground and recycled; and nano-fillers. Suitable melt flow modifiers include, for example, fatty acids and salts thereof, polyamides, polyesters, polyacrylates, polyurethanes, polyethers, polyureas, polyhydric alcohols, and combinations thereof.

The inner core may be made by a fabrication method such as hot-press molding or injection molding. A diameter of inner core may be in a range of about 19 millimeters to about 32 millimeters, or in a range of about 21 millimeters to about 30 millimeters, or in a range of about 24 millimeters to about 28 millimeters. Inner core may have a surface Shore D hardness of 40 to 60.

An outer core layer (such as outer core layer 320 or outer core layer 430) may comprise material selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), crosslinked metallocene catalyzed polyolefin, silicone, and a mixture thereof.

An outer core layer made from thermoset materials may be made by crosslinking a polybutadiene rubber composition. When other rubber is used in combination with a polybutadiene, it is typical that polybutadiene is included as a principal component. Specifically, a proportion of polybutadiene in the entire base rubber is preferably equal to or greater than 50% by weight, and particularly preferably equal to or greater than 80% by weight. A polybutadiene having a proportion of cis-1,4 bonds of equal to or greater than 60 mol %, and further, equal to or greater than 80 mol % is typical. In some embodiments, cis-1,4-polybutadiene may be used as the base rubber and mixed with other ingredients. In some embodiments, the amount of cis-1,4-polybutadiene may be at least 50 parts by weight, based on 100 parts by weight of the rubber compound.

Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties. The filler may be used to increase the specific gravity of the material. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired specific gravity. In some embodiments, the density of an outer core layer may be from about 1.05 $g/mm^3$ to about 1.25 $g/mm^3$. Finally, an outer core layer may have a surface Shore D hardness of from 45 to 65 on the golf ball.

In some embodiments, a polybutadiene synthesized using a rare earth element catalyst may be used. Excellent resilience performance of a golf ball may be achieved by using this polybutadiene. Examples of rare earth element catalysts include lanthanum series rare earth element compounds. Other catalysts may include an organoaluminum compound, and alumoxane and halogen containing compounds. A lanthanum series rare earth element compound is typical. Polybutadiene obtained by using lanthanum series rare earth-based catalysts usually employ a combination of lanthanum series rare earth (atomic number of 57 to 71) compounds, but particularly typical is a neodymium compound.

An outer core layer is preferably made by hot-press molding. Suitable vulcanization conditions include, a vulcanization temperature of between 130 degrees Celsius and 190 degrees Celsius, and a vulcanization time of between 5 and 20 minutes. To obtain the desired rubber crosslinked body for use as the core in the present invention, the vulcanizing temperature is preferably at least 140 degrees Celsius.

When an outer core layer in accordance with this disclosure is produced by vulcanizing and curing the rubber composition in the above-described way, advantageous use may be made of a method in which the vulcanization step is divided into two stages: first, the outer core layer material is placed in an outer core layer-forming mold and subjected to initial vulcanization so as to produce a pair of semi-vulcanized hemispherical cups, following which a prefabricated inner core layer is placed in one of the hemispherical cups and is covered by the other hemispherical cup, in which state complete vulcanization is carried out.

The surface of an inner core layer placed in the hemispherical cups may be roughened before the placement to increase adhesion between an inner core layer and an outer core layer. In some embodiments, inner core layer surface may be pre-coated with an adhesive or pre-treated with chemical(s) before placing inner core layer in the hemispherical cups to enhance the durability of the golf ball and enable a high rebound.

Finally, an inner cover layer (such as inner cover layer 220 shown in FIG. 2, or inner cover layer 420 shown in FIG. 4) in accordance with this disclosure may comprise a thermoplastic material. The thermoplastic material of an inner cover layer may comprise at least one of an ionomer resin, a highly neutralized acid polymer composition, a polyamide resin, a polyurethane resin, a polyester resin, and a combination thereof. In some embodiments, an inner cover layer may comprise the same crosslinked thermoplastic polyurethane as an outer cover layer (discussed above). In some embodiments, an inner cover layer comprises an uncrosslinked thermoplastic polyurethane different from an outer cover layer, while in some embodiments, inner cover layer comprises an entirely different type material from outer cover layer.

An inner cover layer may have a thickness of less than 2 millimeters. In some embodiments, inner cover layer may have a thickness of less than 1.5 millimeters. In some embodiments, inner cover layer has a thickness of less than 1 millimeter. Although inner cover layer may be relatively thin compared the rest of the layers of golf ball 200 or 400, the inner cover layer may have the highest Shore D hardness among all layers. In some embodiments, inner cover layer has a Shore D hardness of at least 60 as measured on the curved surface. In some embodiments, inner cover layer has a Shore D hardness of at least 65 as measured on the curved surface. In some embodiments, the density of inner cover layer may be from about 1.05 $g/mm^3$ to about 1.5 $g/mm^3$ to create a greater moment of inertia.

After a cover layer of a golf ball or an outer cover layer of a golf ball has been molded, the golf ball may undergo various conventional finishing processes such as buffing, stamping and painting. The finished golf ball may have a compression deformation of 2 to 4 millimeters under a load of 10 to 130 kilograms.

EXAMPLES

Two golf balls in accordance with the present disclosure were fabricated as described below, and their scuff resistance was compared to several comparative examples.

For each golf ball, the core was made from a material selected from Table 1, and the cover layer was made from a material selected from Table 2. The amount of the materials listed in Tables 1 and 2 is shown in parts by weight (pbw) or percentages by weight.

TABLE 1

| Core Materials | | |
|---|---|---|
| Rubber compound: | A | B |
| TAIPOL ™ BR0150* | 100 | 100 |
| Zinc diacrylate | 28 | 25 |
| Zinc oxide | 5 | 5 |
| Barium sulfate | 16 | 18 |
| Peroxide | 1 | 1 |

TAIPOL ™ BR0150 is the trade name of a rubber produced by Taiwan Synthetic Rubber Corp.

TABLE 2

| Cover Materials | | | | | | | |
|---|---|---|---|---|---|---|---|
| | C | D | E | F | G | H | I |
| PTMEG (pbw) | 100 | 100 | 100 | 100 | | | |
| BG (pbw) | 15 | 15 | 15 | 15 | | | |
| TMPME (weight % to total components) | 10% | 10% | 0 | 10% | | | |
| DCP (weight % to total components) | 0.2% | 0.5% | 0 | 0 | | | |
| MDI (pbw) | 87.8 | 87.8 | 55.0 | 87.8 | | | |
| (NCO index) | 1.01 | 1.01 | 1.01 | 1.01 | | | |
| Texin ® 245 | | | | | 100 | | |
| Elastollan ® 1195A | | | | | | 100 | |
| Surlyn ® 8940 | | | | | | | 50 |
| Surlyn ® 9910 | | | | | | | 50 |

"PTMEG" is polytetramethylene ether glycol, having a number average molecular weight of 2,000, and is commercially available from Invista, under the trade name of Terathane ® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. Finally, "MDI" is diphenylmethane diisocyanate, commercially available from Huntsman, under the trade name of Suprasec ® 1100.

Cover materials C, D, E and F were formed by mixing PTMEG, BG, TMPME, DCP and MDI in the proportions shown. Specifically, these materials were prepared by mixing the components in a high agitated stir for 1 minute, starting at a temperature of about 70 degrees Celsius, followed by a 10-hour post curing process at a temperature of about 100 degrees Celsius. The post cured polyurethane elastomers are ground into small chips.

Cover materials G, H and I are conventional golf ball cover materials. Texin® 245 is trade name of thermoplastic polyurethane resin by Bayer MaterialScience AG. Elastollan® 1195A is trade name of thermoplastic polyurethane resin by BASF. Surlyn® 8940 and Surlyn® 9910 are trade names of ionomeric resin by E.I. DuPont de Nemours and Company.

From the above core materials and cover materials, seven golf balls were manufactured as shown in Table 3. Generally, the golf balls were manufactured using conventional injection molding processes known in the art of golf ball manufacturing.

In each case, the core had a diameter of 39.3 millimeters, the total golf ball diameter was 42.7 millimeters, and the golf ball's total weight was 45.4 grams.

TABLE 3

| Golf Ball Scuff Resistance | | | | | | | |
|---|---|---|---|---|---|---|---|
| | Examples | | Comparative examples | | | | |
| | 1 | 2 | 3 | 4 | 5 | 6 | 7 |
| Core - Rubber | A | A | A | A | A | A | B |
| Cover | | | | | | | |
| Resin | C | D | E | F | G | H | I |
| Hardness, Shore D | 53 | 53 | 53 | 53 | 53 | 53 | 69 |
| Flexural Modulus | 500 | 500 | 500 | 500 | 10,000 | 9,500 | 49,300 |
| Scuff resistance Rating | 2 | 1 | 3 | 4 | 3 | 3 | 4 |

Identical golf ball precursors comprising 3 layers were covered with the resins numbered "8" through "11" as described in Table 4:

TABLE 4

| Additional Scuff Resistance | | | | |
|---|---|---|---|---|
| Resin | 8 | 9 | 10 | 11 |
| Cross-linked TPU | 100 | | | |
| Texin-245 | | 100 | 50 | |
| Texin-255 | | | 50 | 100 |
| Material Shore D (on the plaque) | 38 | 45 | 50 | 55 |
| Flexural Modulus, psi | 500 | 10,000 | N/A | 20,000 |

The scuff resistance was evaluated (in accordance with the protocol set forth below. The balls were ranked, from best to worst scuff resistance, as follows: 8>9>10>11.

The scuff resistance test was conducted in the following manner: a Nike Victory Red forged standard sand wedge (loft: 54°; bounce: 12°; shaft: True Temper Dynamic Gold shaft; flex: S) is fixed to a swing robot manufactured by Miyamae Co., Ltd. and then swung at the head speed of about 32 m/s. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. Three samples of each ball were tested. Each ball was hit three times.

Other methods may also be used to determine the scuff resistance, such as the methods described in the commonly assigned copending application titled "Golf Ball Wear Indicator", U.S. Patent and Trademark Office Ser. No. 12/691,282, filed Jan. 21, 2010 in the name of Brad Tutmark.

After the above described scuff resistance testing, each golf ball cover was visually observed and rated according to the following scale: a golf ball cover was rated "1" when little or no damage was visible, only groove markings or dents; a golf ball cover was rated "2" when small cuts and/or ripples in the cover were apparent; a golf ball cover was rated "3" when moderate amounts of cover material were lifted from the ball's surface, but the cover material was still attached to the ball; and finally a golf ball cover was rated "4" when cover material was removed or barely attached to the golf ball.

Unless otherwise noted, Shore D hardness values of the core and cover layer were measured on the spherical surface of the layer to be measured by using a Shore D hardness tester.

As shown in Table 3, golf ball examples 1 and 2 made from compositions including a crosslinked thermoplastic polyurethane elastomer having crosslinks located in the hard segments, where the crosslinks are the reaction product of unsaturated bonds located in the hard segments catalyzed by a free radical initiator, provide superior scuff resistance as compared to cover compositions that do not include crosslinks.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of making a golf ball comprising:
   (a) preparing a thermoplastic polyurethane elastomer having crosslinks in hard segments by reacting (i) an unsaturated diol

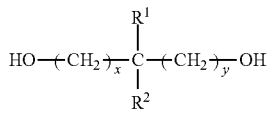

in which $R^1$ is a substituted or unsubstituted alkyl group, substituted or unsubstituted aryl group, substituted or unsubstituted alkyl-aryl group, substituted or unsubstituted ether group, substituted or unsubstituted ester group, a combination of these, or H, and optionally includes an unsaturated bond in any main chain or side chain of any group; $R^2$ comprises an allyl group optionally attached by a substituted or unsubstituted alkylene group, substituted or unsubstituted arylene group, substituted or unsubstituted alkylarylene group, substituted or unsubstituted ether group, or substituted or unsubstituted ester group; and x and y are integers independently having a value from 1 to 10, (ii) a diisocyanate, (iii) a polyol having a molecular weight between about 500 and about 4000, and optionally (iv) a chain extender selected from diols, diamines, and amino alcohols having a molecular weight less than about 450;
   wherein a free radical initiator induces crosslinking of the allyl group and, if present, the optional unsaturated bond of $R^1$ and
   wherein the NCO index of the reactants is from about 0.9 to about 1.3 to form a crosslinked, thermoplastic polyurethane elastomer;
   (b) forming the thermoplastic polyurethane into pellets or chips;
   (c) molding the pellets or chips to form a cover layer around a ball comprising an inner core layer, an outer core layer substantially surrounding the inner core layer, and an inner cover layer substantially surrounding the outer core layer to form a golf ball,
   wherein the inner core layer comprises a highly neutralized acid polymer composition that is neutralized to 70% or higher, the outer core layer comprises a polybutadiene rubber; and the inner cover layer comprises a thermoplastic polyurethane.

2. A method of making a golf ball according to claim 1, wherein unsaturated diol (i) comprises

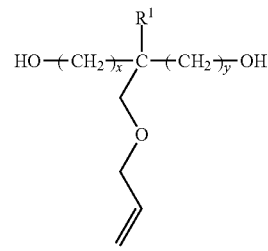

in which $R^1$ is a substituted or unsubstituted alkyl group and x and y are integers independently having any value from 1 to 4.

3. A method of making a golf ball according to claim 1, wherein unsaturated diol (i) comprises trimethylolpropane monoallyl ether.

4. A method of making a golf ball according to claim 1, wherein the inner core layer has a coefficient of restitution at 40 meters per second from about 0.785 to about 0.9, wherein the coefficient of restitution of the inner core is higher than the coefficient of restitution of the golf ball.

5. A method of making a golf ball according to claim 1, wherein the inner core layer has a diameter of from about 19 to about 32 millimeters.

6. A method of making a golf ball according to claim 1, wherein the inner cover layer has a surface Shore D hardness of at least about 60.

7. A method of making a golf ball according to claim 1, wherein the molding in step (c) comprises injection molding or compression molding.

8. A method of making a golf ball according to claim 1, wherein the cover layer molded in step (c) has a flexural modulus of from about 200 psi to about 10,000 psi.

9. A method of making a golf ball according to claim 1, wherein the cover layer molded in step (c) has a Shore D hardness of between about 40 and about 65 on the golf ball.

* * * * *